US012677154B2

(12) United States Patent
Vlasach et al.

(10) Patent No.: US 12,677,154 B2
(45) Date of Patent: Jul. 7, 2026

(54) ZERO-TOUCH SECURE DNS DEVICE PROVISIONING

(71) Applicant: JAMF Software, LLC, Minneapolis, MN (US)

(72) Inventors: Matthew Vlasach, Larkspur, CA (US); Dan Cuddeford, Mill Valley, CA (US); Jakub Talas, Brno (CZ)

(73) Assignee: JAMF Software, LLC, Minneapolis, MN (US)

( * ) Notice: Subject to any disclaimer, the term of this patent is extended or adjusted under 35 U.S.C. 154(b) by 279 days.

(21) Appl. No.: 18/215,799

(22) Filed: Jun. 28, 2023

(65) Prior Publication Data

US 2025/0008330 A1     Jan. 2, 2025

(51) Int. Cl.
*H04L 29/06* (2006.01)
*H04L 9/40* (2022.01)
*H04W 12/30* (2021.01)

(52) U.S. Cl.
CPC ......... *H04W 12/35* (2021.01); *H04L 63/0823* (2013.01); *H04L 63/1433* (2013.01); *H04L 63/20* (2013.01)

(58) Field of Classification Search
CPC ..... H04W 12/35; H04L 63/0823; H04L 63/20
See application file for complete search history.

(56) References Cited

U.S. PATENT DOCUMENTS

| | | | |
|---|---|---|---|
| 2016/0087955 A1* | 3/2016 | Mohamad Abdul | ......................... H04L 47/125 726/7 |
| 2019/0334869 A1* | 10/2019 | Grant | .................. H04L 63/0823 |
| 2022/0030049 A1* | 1/2022 | Varda | ...................... H04L 67/10 |

* cited by examiner

*Primary Examiner* — Wasika Nipa
(74) *Attorney, Agent, or Firm* — Benesch Friedlander Coplan & Aronoff LLP

(57)     ABSTRACT

In certain aspects of the present disclosure, a computer-implemented method includes receiving a configuration profile from a risk assessment service, wherein the risk assessment service generated the configuration profile to comprise service policies associated with DNS traffic and an HTTPS URL. The method includes modifying the HTTPS URL of the configuration profile to include an UDID associated with a target device. The method includes transmitting, to the target device, the configuration profile comprising the HTTPS URL with the UDID associated with the target device, wherein the risk assessment service, responsive to the target device receiving the configuration profile, generates a device object based on the configuration profile comprising the HTTPS URL with the UDID. The method includes identifying, based on the UDID, meta data associated with the target device for returning a DNS response to a DNS request from the target device. Systems and machine-readable media are also provided.

14 Claims, 4 Drawing Sheets

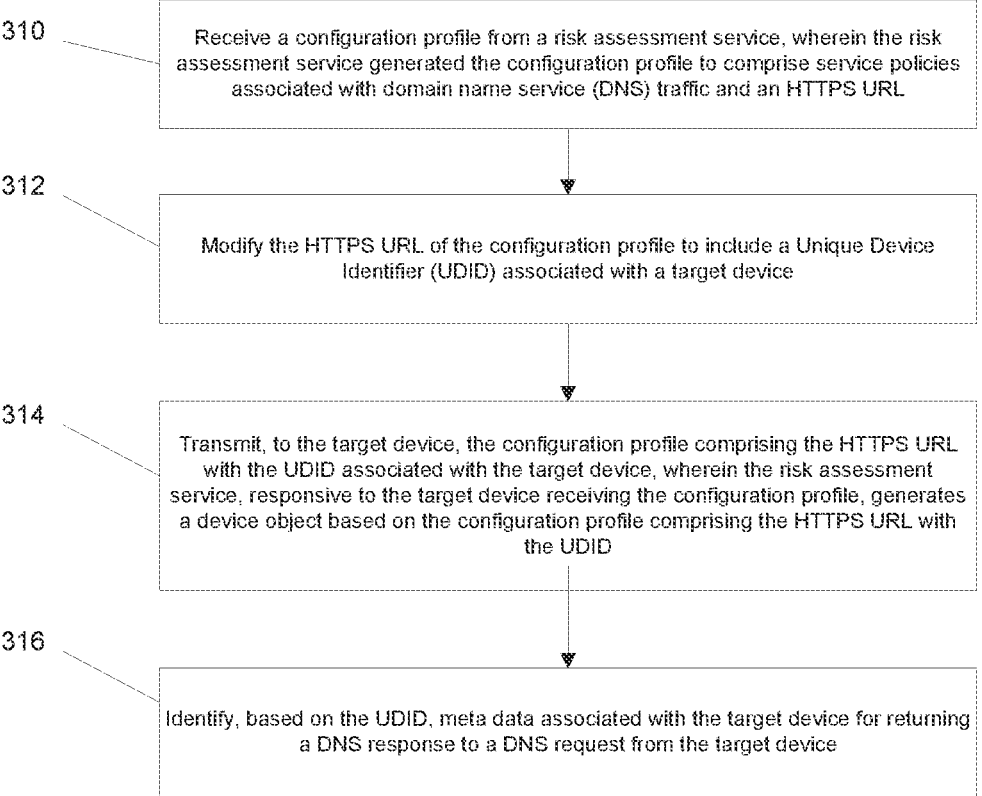

310    Receive a configuration profile from a risk assessment service, wherein the risk assessment service generated the configuration profile to comprise service policies associated with domain name service (DNS) traffic and an HTTPS URL 312    Modify the HTTPS URL of the configuration profile to include a Unique Device Identifier (UDID) associated with a target device 314    Transmit, to the target device, the configuration profile comprising the HTTPS URL with the UDID associated with the target device, wherein the risk assessment service, responsive to the target device receiving the configuration profile, generates a device object based on the configuration profile comprising the HTTPS URL with the UDID 316    Identify, based on the UDID, meta data associated with the target device for returning a DNS response to a DNS request from the target device

PROCESSOR
402

MEMORY 404

DATA STORAGE
406

BUS 408

INPUT/OUTPUT MODULE 410

COMMUNICATIONS
MODULE
412

INPUT
DEVICE
414

OUTPUT DEVICE
416

ZERO-TOUCH SECURE DNS DEVICE PROVISIONING

TECHNICAL FIELD

The present disclosure generally relates to mobile device provisioning and management systems, and more specifically relates to zero-touch secure DNS device provisioning.

BACKGROUND

Within various organizations, provisioning devices into a network security tool typically involves sharing a single configuration across many devices. With these conventional techniques, configuration granularity is often lacking and may require user authentication. Accordingly, there is a desire to provide an easy, secure, and agentless means of securing Domain Name System (DNS) traffic to target devices.

The description provided in the background section should not be assumed to be prior art merely because it is mentioned in or associated with the background section. The background section may include information that describes one or more aspects of the subject technology.

SUMMARY

In particular aspects, the present disclosure provides systems and methods that enable a "manager" or "primary" mobile device to perform selected MDM functions with respect to one or more "managed," "targeted," or "secondary" mobile devices. For example, in an healthcare context, the manager device may be a tablet computer or smart phone operated by a nurse unit manager and the managed devices may be tablet computers or smart phones operated by nurses. By authorizing a nurse unit manager to perform certain MDM functions, an overall mobile device experience in the healthcare environment may be improved. For example, nurse unit managers may no longer have to communicate with IT administrators for relatively minor issues arising on the managed devices. For example, a nurse unit manager may use his or her manager device to unlock the managed device(s).

According to certain aspects of the present disclosure, a computer-implemented method is provided. The method includes receiving a configuration profile from a risk assessment service, wherein the risk assessment service generated the configuration profile to comprise service policies associated with domain name system (DNS) traffic and an HTTPS URL. The method includes modifying the HTTPS URL of the configuration profile to include a Unique Device Identifier (UDID) associated with a target device. The method includes transmitting, to the target device, the configuration profile comprising the HTTPS URL with the UDID associated with the target device, wherein the risk assessment service, responsive to the target device receiving the configuration profile, generates a device object based on the configuration profile comprising the HTTPS URL with the UDID. The method includes identifying, based on the UDID, meta data associated with the target device for returning a DNS response to a DNS request from the target device.

According to other aspects of the present disclosure, a system is provided. The system includes a memory comprising instructions and a processor configured to execute the instructions which, when executed, cause the processor to receive a configuration profile from a risk assessment service, wherein the risk assessment service generated the configuration profile to comprise service policies associated with domain name system (DNS) traffic and an HTTPS URL. The processor is configured to execute the instructions which, when executed, cause the processor to modify the HTTPS URL of the configuration profile to include a Unique Device Identifier (UDID) associated with a target device. The processor is configured to execute the instructions which, when executed, cause the processor to transmit, to the target device, the configuration profile comprising the HTTPS URL with the UDID associated with the target device, wherein the risk assessment service, responsive to the target device receiving the configuration profile, generates a device object based on the configuration profile comprising the HTTPS URL with the UDID. The processor is configured to execute the instructions which, when executed, cause the processor to identify, based on the UDID, meta data associated with the target device for returning a DNS response to a DNS request from the target device.

According to other aspects of the present disclosure, a non-transitory machine-readable storage medium comprising machine-readable instructions for causing a processor to execute a method is provided. The method includes receiving a configuration profile from a risk assessment service, wherein the risk assessment service generated the configuration profile to comprise service policies associated with domain name system (DNS) traffic and an HTTPS URL. The method includes modifying the HTTPS URL of the configuration profile to include a Unique Device Identifier (UDID) associated with a target device. The method includes transmitting, to the target device, the configuration profile comprising the HTTPS URL with the UDID associated with the target device, wherein the risk assessment service, responsive to the target device receiving the configuration profile, generates a device object based on the configuration profile comprising the HTTPS URL with the UDID. The method includes identifying, based on the UDID, meta data associated with the target device for returning a DNS response to a DNS request from the target device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. It should be noted that although various aspects may be described herein with reference to healthcare, retail, educational, or corporate settings, these are examples only and are not to be considered limiting. The teachings of the present disclosure may be applied to any mobile device environments, including but not limited to home environments, healthcare environments, retail environments, educational environments, corporate environments, and other appropriate environments. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 3 illustrates an example process for zero-touch secure DNS device provisioning using the example mobile management service, target device(s), risk management service, DNS traffic service, and push notification service of FIG. 2.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The disclosed technology addresses a technical problem tied to computer technology and arising in the realm of mobile device management, namely the technical problem of deploying device-unique configurations that enable further device-specific capabilities that are facilitated by services outside of the device management system. The disclosed system addresses this technical problem by provisioning a device just-in-time within a network risk-assessment service, and without an agent, to enable secure DNS traffic for the device.

Figure 1:
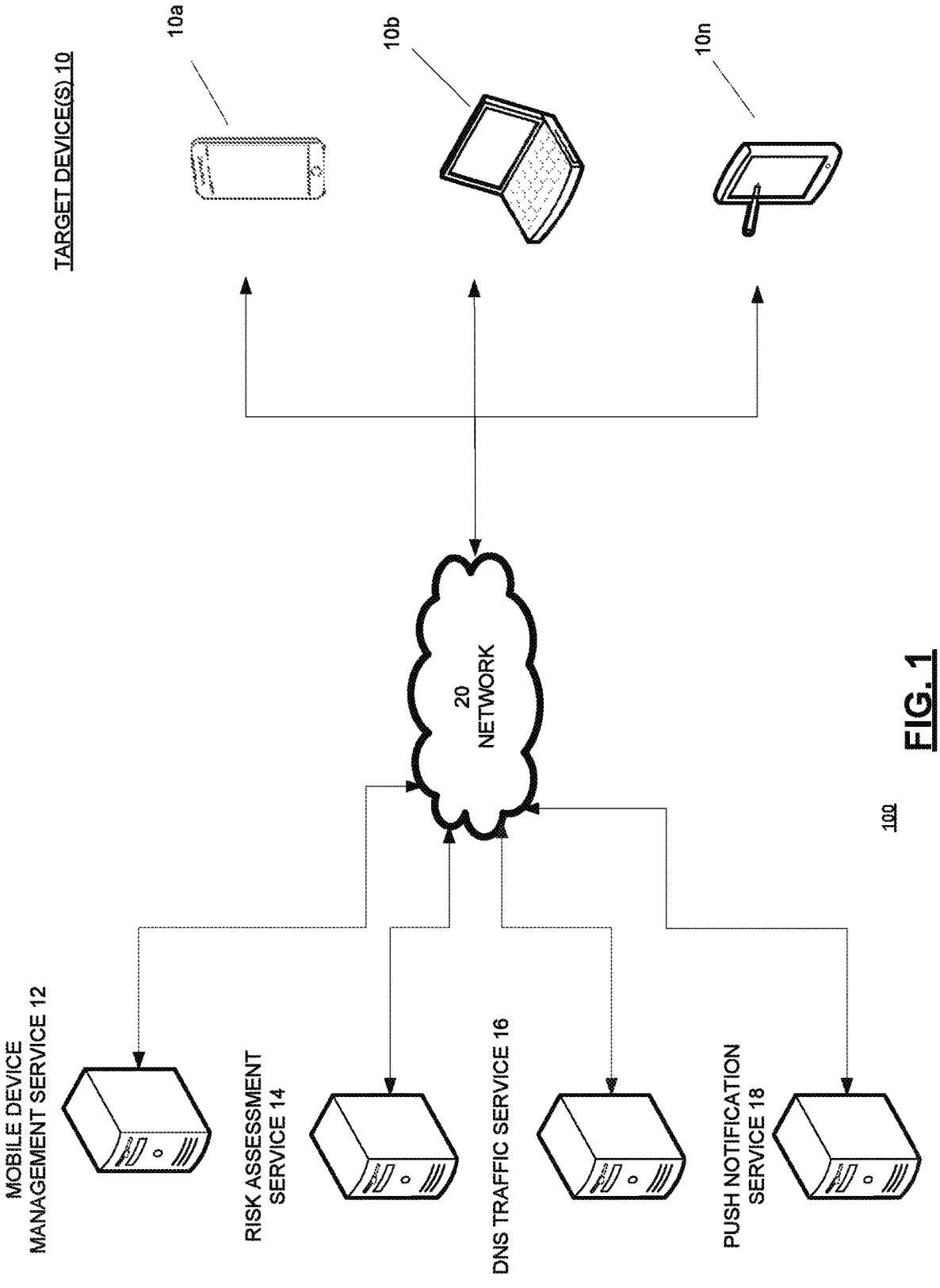
FIG. 1 illustrates an example architecture for zero-touch secure DNS device provisioning.

FIG. 1 illustrates an example architecture 100 for zero-touch secure DNS device provisioning. For example, the architecture 100 includes at least one target device 10, such as a first target device 10*a* and a second target device 10*b* to an nth target device 10*n*, a mobile device management service 12, a risk assessment service 14, a Domain Name System (DNS) traffic service 16 and a push notification service 18 all connected over a network 20. In certain aspects, the mobile device management service 12 may be connected to the push notification service 18 over a separate network.

The mobile device management service 12 can be any device having an appropriate processor, memory, and communications capability for communicating with the at least one target device 10, the risk assessment service 14, the DNS traffic service 16, and the push notification service 18. For purposes of load balancing, the mobile device management service 12 may include multiple servers. The risk assessment service 14 can be any device having an appropriate processor, memory, and communications capability for communicating with the mobile device management service 12 and the DNS traffic service 16. The DNS traffic service 16 can be any device having an appropriate processor, memory, and communications capability for communicating with the mobile device management service 12, the risk assessment service 14, and the at least one target device 10. The push notification service 18 can be any device having an appropriate processor, memory, and communications capability for communicating with the mobile device management service 12 and the at least one target device 10. The at least one target device 10, to which the mobile device management service 12 communicates with over the network 20, can be, for example, a tablet computer, a mobile phone, a mobile computer, a laptop computer, a portable media player, an electronic book (eBook) reader, or any other device having appropriate processor, memory, and communications capabilities. In certain aspects, the mobile device management service 12, the risk assessment service 14, the DNS traffic service 16, and the push notification service 18 can be a cloud computing server of an infrastructure-as-a-service (IaaS) and be able to support a platform-as-a-service (PaaS) and software-as-a-service (SaaS) services.

It should be noted that although two target devices, such as the first target device 10*a* and the second target device 10*b* to the nth target device 10*n*, are shown in FIG. 1, the present disclosure is not limited to any particular configuration or number of devices. In certain aspects, a different number of target devices may be present.

The network 20 can include, for example, any one or more of a personal area network (PAN), a local area network (LAN), a campus area network (CAN), a metropolitan area network (MAN), a wide area network (WAN), a broadband network (BBN), the Internet, and the like. Further, the network 20 can include, but is not limited to, any one or more of the following network topologies, including a bus network, a star network, a ring network, a mesh network, a star-bus network, tree or hierarchical network, and the like.

Figure 2:
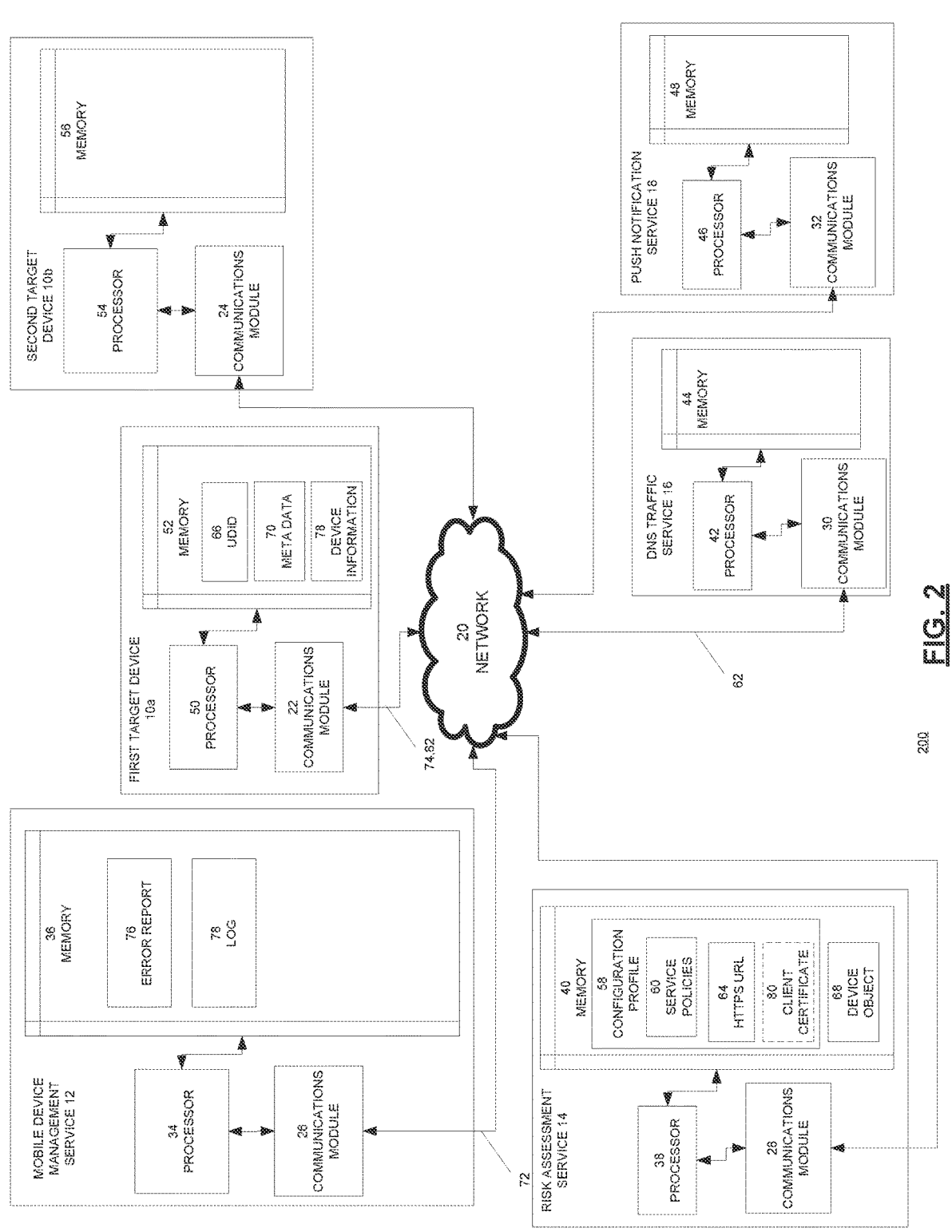
FIG. 2 is a block diagram illustrating the example mobile management service, target device(s), risk management service, DNS traffic service, and push notification service from the architecture of FIG. 1 according to certain aspects of the disclosure.

FIG. 2 is a block diagram illustrating examples of the first target device 10*a*, the second target device 10*b*, the mobile device management service 12, the risk assessment service 14, the DNS traffic service 16, and the push notification service 18 in the architecture of FIG. 1 according to certain aspects of the disclosure. It should be understood that for purposes of explanation the first target device 10*a* and the second target device 10*b* are described, but any number of the at least one target device 10 could be used.

The first target device 10*a*, the second target device 10*b*, the mobile device management service 12, the risk assessment service 14, the DNS traffic service 16, and the push notification service 18 are connected over the network 20 via respective communication modules 22, 24, 26, 28, 30, 32. The communication modules 22, 24, 26, 28, 30, 32 are configured to interface with the network 20 to send and receive information, such as data, requests, responses, and commands to other devices on the network 20. The communications modules 22, 24, 26, 28, 30, 32 can be, for example, modems or Ethernet cards.

The mobile device management service 12 includes a processor 34, the communications module 26, and a memory 36. The processor 34 of the mobile device management service 12 is configured to execute instructions, such as instructions physically coded into the processor 34, instructions received from software in the memory 36, or a combination of both. The processor 34 of the mobile device management service 12 is configured to receive a configuration profile 58 from the risk assessment service 14. In certain aspects, the risk assessment service 14 generates the configuration profile 58 to comprise service policies 60 associated with domain name system (DNS) traffic 62 and an HTTPS URL 64. The processor 34 of the mobile device management service 12 is configured to modify the HTTPS URL 64 of the configuration profile 58 to include a Unique Device Identifier (UDID) 66 associated with the at least one target device 10, such as the first target device 10*a*. The processor 34 of the mobile device management service 12 is configured to transmit, to the first target device 10*a*, the configuration profile 58, which includes the HTTPS URL 64 with the UDID 66 associated with the first target device 10*a*. The processor 34 of the mobile device management service 12 is configured to identify, based on the UDID 66, meta data 70 associated with the first target device 10*a* for returning a DNS response 72 to a DNS request 74 received from the first target device 10*a*.

In certain aspects, the processor 34 of the mobile device management service 12 is configured to transmit, responsive to receiving the DNS request 74 from the first target device 10*a*, the DNS response 72 to the first target device 10*a* based on the service policies 60 of the configuration profile 58 associated the first target device 10*a*. In certain aspects, the processor 34 of the mobile device management service 12 is configured to maintain service for the first target device 10*a* when the first target device 10*a* is identified as being administratively decommissioned. In certain aspects, the processor 34 of the mobile device management service 12 is configured to encode an error report 76 into the DNS response 72. In certain aspects, the processor 34 of the mobile device management service 12 is configured to generate a log 78 associated with receiving the DNS request 74 from the first target device 10*a*.

In certain aspects, the service policies 60 include a capability to limit access to Domain Name Service over HTTPS (DoH) URLs based on a client certificate 80 associated with the first target device 10*a*. In certain aspects, the client certificate 80 can be, but is not limited to an Automated Certificate Management Environment (ACME), a Simple Certificate Enrollment Protocol (SCEP), and other appropriate certificate types. In such aspects, for example, a DNS settings and a certificate payload, such as the ACME certificate payload or SCEP certificate payload, is deployed to the first target device 10*a*. Upon receiving the certificate payload, the first target device 10*a* securely generates a private key on the first target device 10*a*. The first target device 10*a* then reaches out to the certificate server, such as the ACME server or SCEP server, requesting a certificate using a certificate signing request (CSR) process. The resulting certificate, such as the client certificate 80, is attached to the DNS settings configuration, which may be included in the service policies 60 of the configuration profile 58. When the first target device 10*a* contacts the DNS resolver service (DoH), the service challenges the first target device 10*a* for its client certificate (e.g., the client certificate 80) via mutual Transport Layer Security (TLS), for example. The first target device 10*a* uses the certificate acquired per the above (e.g., the client certificate 80) to respond to the service challenge. The DNS resolver service validates the response (e.g., the client certificate 80) including the certificate authority chain and attestation claims. After the client certificate 80 is validated, the first target device 10*a* is provisioned. Subsequent DNS requests/responses are handle as described herein.

The risk assessment service 14 includes a processor 38, the communications module 28, and a memory 40. The processor 38 of the risk assessment service 14 is configured to execute instructions, such as instructions physically coded into the processor 38, instructions received from software in the memory 40, or a combination of both. The processor 38 of the risk assessment service 14 is configured to generate the configuration profile 58 to comprise service policies 60 associated with domain name system (DNS) traffic 62 and the HTTPS URL 64. The processor 38 of the risk assessment service 14 is configured to transmit the configuration profile 58, after generation, to the mobile device management service 12. The processor 38 of the risk assessment service 14 is configured to, responsive to the first target device 10*a* receiving the configuration profile 58, generate a device object 68 based on the configuration profile 58, which includes the HTTPS URL 64 with the UDID 66. In certain aspects, the processor 38 of the risk assessment service 14 generates the device object 68 in response to instructions received from the DNS traffic service 16.

The DNS traffic service 16 includes a processor 42, the communications module 30, and a memory 44. The processor 44 of the DNS traffic service 16 is configured to execute instructions, such as instructions physically coded into the processor 42, instructions received from software in the memory 44, or a combination of both. The processor 42 of the DNS traffic service 16 is configured to, responsive to the first target device 10*a* receiving the configuration profile 58, generate the device object 68 based on the configuration profile 58, which includes the HTTPS URL 64 with the UDID 66. In other aspects, the processor 42 of the DNS traffic service 16 is configured to, instead, transmit instructions to the risk assessment service 14 to generate the device object 68.

The push notification service 18 includes a processor 46, the communications module 32, and a memory 48. The processor 46 of the push notification service 18 is configured to execute instructions, such as instructions physically coded into the processor 46, instructions received from software in the memory 48, or a combination of both.

The first target device 10*a* includes a processor 50, the communications module 22, and a memory 52. The processor 50 of the first target device 10*a* is configured to execute instructions, such as instructions physically coded into the processor 50, instructions received from software in memory 52, or a combination of both.

The second target device 10*b* includes a processor 54, the communications module 24, and a memory 56. The processor 54 of the second target device 10*b* is configured to execute instructions, such as instructions physically coded into the processor 54, instructions received from software in memory 56, or a combination of both.

It should be noted that although various embodiments may be described herein with reference to healthcare and educational settings, this is for example only and not to be considered limiting. The teachings of the present disclosure may be applied in other mobile device environments, including but not limited to home environments, corporate environments, retail environments, government environments, organization environments, and other well-known environments.

FIG. 3 illustrates an example process 300 using the first target device 10*a*, the mobile device management service 12, the risk assessment service 14, the DNS traffic service 16, and, in certain aspects, the push notification service 18.

While FIG. 3 is described with reference to FIG. 2, it should be understood that the process steps of FIG. 3 may be performed by other systems.

The process 300 begins by proceeding to step 310 when the processor 34 of the mobile device management service 12 receives a configuration profile 58 from the risk assessment service 14. In certain aspects, the risk assessment service 14 generates the configuration profile 58 to comprise service policies 60 associated with domain name system (DNS) traffic 62 and an HTTPS URL 64. As depicted at step 312, the processor 34 of the mobile device management service 12 modifies the HTTPS URL 64 of the configuration profile 58 to include a Unique Device Identifier (UDID) 66 associated with the at least one target device 10, such as the first target device 10a.

As depicted at step 314, the processor 34 of the mobile device management service 12 transmits, to the first target device 10a, the configuration profile 58, which includes the HTTPS URL 64 with the UDID 66 associated with the first target device 10a. In certain aspects, the risk assessment service 14, responsive to the first target device 10a receiving the configuration profile 58 from the mobile device management service 12, generates a device object 68 based on the configuration profile 58, which includes the HTTPS URL 64 with the UDID 66. The processor 34 of the mobile device management service 12 identifies, based on the UDID 66, meta data 70 associated with the first target device 10a for returning a DNS response 72 to a DNS request 74 received from the first target device 10a, as illustrated at step 316.

An example will now be described with reference to the example process 300 of FIG. 3.

For instance, during an example zero-touch secure DNS provisioning of a device, the risk assessment service 14 generates the configuration profile 58 to define the service policies 60 (e.g., capabilities) that should be delivered using DNS traffic vectoring. The configuration profile 58 is generated in accordance with an organization's specific MDM service, such as the mobile device management service 12, and platform associated with the at least one target device 10, such as the first target device 10a. The mobile device management service 12 downloads or receives the configuration profile 58 from the risk assessment service 14, appends the UDID 66 associated with the first target device 10a to the configuration profile 58, and pushes or transmits the configuration profile 58, including the HTTPS URL 64 and the UDID 66, to the at least one target device 10, such as the first target device 10a, via the push notification service 18.

The configuration profile 58 including the HTTPS URL 64 and the UDID 66 is received by the at least one target device 10, such as the first target device 10a, and is immediately activated by the operating system on the first target device 10a. The DNS traffic service 16 receives an activation request 82 responsive to the first target device 10a activating the configuration profile 58, and based on the activation request 82, generates the device object 68 based on the information encoded in the HTTPS URL 64. In other aspects, the DNS traffic service 16 transmits instructions to the risk assessment service 14 to generate the device object 68 based on the information encoded in the HTTPS URL 64.

The device object 68 is a logical representation of, for example, the first target device 10a outside of the mobile device management service 12 system. As described above, the device object 68 is generated using the dynamic attributes present in the configuration profile 58 that was pushed from the mobile device management service 12. For example, the configuration profile 58 may include a configuration variable with one attribute being a "dohAddress" (e.g., https://doh.jamf.com/abcd123/$UDID). The "$UDID" variable will be resolved to the UDID 66 of the first target device 10a with an external identifier (e.g., https://doh.jamf.com/abcd123/aaaabbbbccccdddd). That resolved value is pushed to the first target device 10a and installed into the OS's DNS resolver. Moreover, the external identifier (e.g., aaaabbbbccccdddd) can be further used to query the mobile device management service 12 to enrich device with meta data 70 from the mobile device management service 12 via API calls.

Moving forward, the mobile device management service 12 then looks up the meta data 70 associated with the first target device 10a using the UDID 66 it received as a lookup key. The mobile device management service 12 is now fully aware of the first target device 10a. Accordingly, the mobile device management service 12 will return a DNS response 72, in response to receiving a DNS request 74 from the first target device 10a, to the first target device 10a based on the service policies 60 that were assigned to the first target device 10a and configured by the risk assessment service 14.

Although certain embodiments and workflows are described herein with reference to performing mobile device management for a single managed device, it should be understood that mobile device management may also be performed for multiple devices, such as the first target device 10a and the second target device 10b to the nth target device 10n. In certain aspects, for example, the mobile device management service 12 can be configured to select multiple target devices or a group of target devices to transmit the configuration profile 58. For example, the push notification service 18 may send push notifications to a target device or multiple target devices to communicate with the mobile device management service 12.

Figure 4:
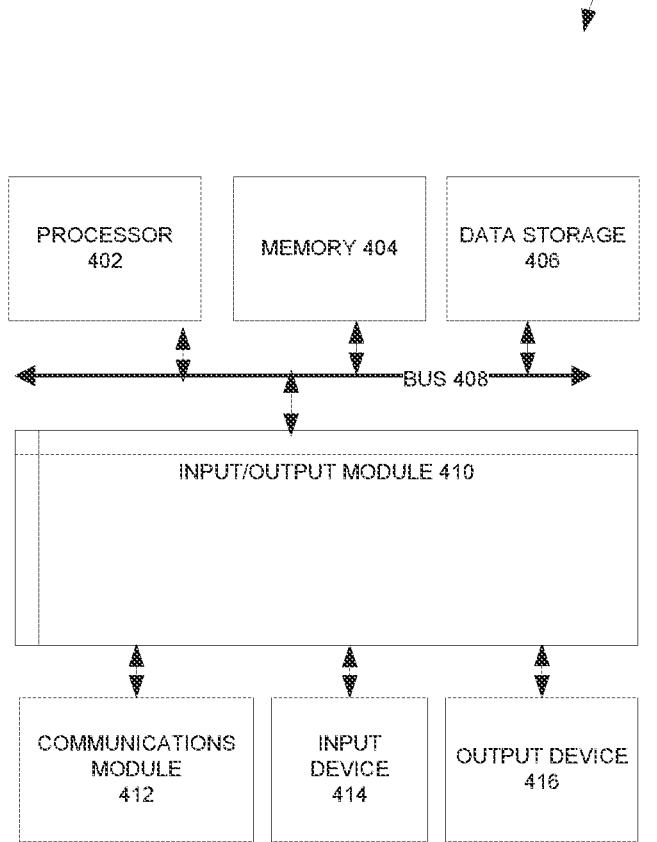
FIG. 4 is block diagram illustrating an example computer system with which the mobile management service, target device(s), risk management service, DNS traffic service, and push notification service of FIG. 2 can be implemented.

FIG. 4 is a block diagram illustrating an example computer system 400 with which the first target device 10a, the second target device 10b, the mobile device management service 12, the risk assessment service 14, the DNS traffic service 16, and the push notification service 18 of FIG. 2 can be implemented. In certain aspects, the computer system 400 may be implemented using hardware or a combination of software and hardware, either in a dedicated server, or integrated into another entity, or distributed across multiple entities.

Computer system 400 (e.g., the first target device 10a, the second target device 10b, the mobile device management service 12, the risk assessment service 14, the DNS traffic service 16, and the push notification service 18) includes a bus 408 or other communication mechanism for communicating information, and a processor 402 (e.g., the processor 30, 36, 40, 44, 48) coupled with bus 408 for processing information. According to one aspect, the computer system 400 can be a cloud computing server of an IaaS that is able to support PaaS and SaaS services.

Computer system 400 can include, in addition to hardware, code that creates an execution environment for the computer program in question, e.g., code that constitutes processor firmware, a protocol stack, a database management system, an operating system, or a combination of one or more of them stored in an included memory 404 (e.g., the memory 36, 40, 44, 48, 52, 56), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, special purpose logic circuitry.

The instructions may be stored in the memory 404 and implemented in one or more computer program products, e.g., one or more modules of computer program instructions encoded on a computer readable medium for execution by, or to control the operation of, the computer system 400.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 400 further includes a data storage device 406 such as a magnetic disk or optical disk, coupled to bus 408 for storing information and instructions. Computer system 400 may be coupled via input/output module 410 to various devices. The input/output module 410 can be any input/output module. Example input/output modules 410 include data ports such as USB ports. In addition, input/output module 410 may be provided in communication with processor 402, so as to enable near area communication of computer system 400 with other devices. The input/output module 410 may provide, for example, for wired communication in some implementations, or for wireless communication in other implementations, and multiple interfaces may also be used. The input/output module 410 is configured to connect to a communications module 412. Example communications modules 412 (e.g., the communications module 22, 24, 26, 28, 30, 32) include networking interface cards, such as Ethernet cards and modems.

In certain aspects, the input/output module 410 is configured to connect to a plurality of devices, such as an input device 414 and/or an output device 416. Example input devices 414 include a keyboard and a pointing device, e.g., a mouse or a trackball, by which a user can provide input to the computer system 400. Other kinds of input devices 414 can be used to provide for interaction with a user as well, such as a tactile input device, visual input device, audio input device, or brain-computer interface device.

According to one aspect of the present disclosure the first target device 10*a*, the second target device 10*b*, the mobile device management service 12, the risk assessment service 14, the DNS traffic service 16, and the push notification service 18 can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the process steps described herein. One or more processors in a multi-processing arrangement may also be employed to execute the sequences of instructions contained in memory 404. Processor 402 may process the executable instructions and/or data structures by remotely accessing the computer program product, for example by downloading the executable instructions and/or data structures from a remote server through communications module 412 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

The term "machine-readable storage medium" or "computer-readable medium" as used herein refers to any medium or media that participates in providing instructions or data to processor 402 for execution. The term "storage medium" as used herein refers to any non-transitory media that store data and/or instructions that cause a machine to operate in a specific fashion. Such a medium may take many forms, including, but not limited to, non-volatile media, volatile media, and transmission media.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 508. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in either one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method comprising:

receiving, at a mobile device management service, a configuration profile from a risk assessment service, wherein the risk assessment service generated the configuration profile to comprise service policies associated with domain name system (DNS) traffic and an HTTPS URL;

modifying, by the mobile device management service, the HTTPS URL of the configuration profile to include a Unique Device Identifier (UDID) associated with a target device;

transmitting, by the mobile device management service to the target device, the configuration profile comprising the HTTPS URL with the UDID associated with the target device, wherein the risk assessment service, responsive to the target device receiving the configuration profile from the mobile device management service, generates a device object based on the configuration profile comprising the HTTPS URL with the UDID;

identifying agentlessly, by the mobile device management service, based on the UDID, meta data associated with the target device for returning a DNS response to a DNS request from the target device; and maintaining service for the target device when the target device is identified as being administratively decommissioned, wherein the service policies comprise a capability to limit access to Domain Name System over HTTPS (DoH) URLs based on a client certificate associated with the target device.

2. The computer-implemented method of claim 1, further comprising:

transmitting, responsive to receiving the DNS request from the target device, the DNS response to the target device based on the service policies of the configuration profile associated with the target device.

3. The computer-implemented method of claim 1, further comprising:

encoding an error report into the DNS response.

4. The computer-implemented method claim 1, further comprising:

generating a log associated with receiving the DNS request from the target device.

5. The computer-implemented method of claim 1, wherein the client certificate is one of Automated Certificate Management Environment (ACME) and Simple Certificate Enrollment Protocol (SCEP).

6. A system comprising:

a memory comprising instructions; and a processor configured to execute the instructions which, when executed, cause the processor to:

receive, at a mobile device management service, a configuration profile from a risk assessment service, wherein the risk assessment service generated the configuration profile to comprise service policies associated with domain name system (DNS) traffic and an HTTPS URL;

modify, by the mobile device management service, the HTTPS URL of the configuration profile to include a Unique Device Identifier (UDID) associated with a target device;

transmit, by the mobile device management service to the target device, the configuration profile comprising the HTTPS URL with the UDID associated with the target device, wherein the risk assessment service, responsive to the target device receiving the configuration profile from the mobile device management service, generates a device object based on the configuration profile comprising the HTTPS URL with the UDID;

identify agentlessly, by the mobile device management service, based on the UDID, meta data associated with the target device for returning a DNS response to a DNS request from the target device; and

maintain service for the target device when the target device is identified as being administratively decommissioned, wherein the service policies comprise a capability to limit access to Domain Name System over HTTPS (DoH) URLs based on a client certificate associated with the target device.

7. The system of claim 6, further comprising instructions to cause the processor to:

transmit, responsive to receiving the DNS request from the target device, the DNS response to the target device based on the service policies of the configuration profile associated the target device.

8. The system of claim 6, further comprising instructions to cause the processor to:

encode an error report into the DNS response.

9. The system of claim 6, further comprising instructions to cause the processor to:

generate a log associated with receiving the DNS request from the target device.

10. The system of claim 6, wherein the client certificate is one of Automated Certificate Management Environment (ACME) and Simple Certificate Enrollment Protocol (SCEP).

11. A non-transitory machine-readable storage medium comprising machine-readable instructions for causing a processor to execute a method, the method comprising:

receiving, at a mobile device management service, a configuration profile from a risk assessment service, wherein the risk assessment service generated the configuration profile to comprise service policies associated with domain name system (DNS) traffic and an HTTPS URL;

modifying, by the mobile device management service, the HTTPS URL of the configuration profile to include a Unique Device Identifier (UDID) associated with a target device;

transmitting, by the mobile device management service to the target device, the configuration profile comprising the HTTPS URL with the UDID associated with the target device, wherein the risk assessment service, responsive to the target device receiving the configuration profile from the mobile device management service, generates a device object based on the configuration profile comprising the HTTPS URL with the UDID;

identifying agentlessly, by the mobile device management service, based on the UDID, meta data associated with the target device for returning a DNS response to a DNS request from the target device; and maintaining service for the target device when the target device is identified as being administratively decommissioned, wherein the service policies comprise a capability to limit access to Domain Name System over HTTPS (DoH) URLs based on a client certificate associated with the target device.

12. The non-transitory machine-readable storage medium of claim 11, further including instructions for causing the processor to execute the method comprising:

transmitting, responsive to receiving the DNS request from the target device, the DNS response to the target device based on the service policies of the configuration profile associated the target device.

13. The non-transitory machine-readable storage medium of claim 11, further including instructions for causing the processor to execute the method comprising:

encoding an error report into the DNS response.

14. The non-transitory machine-readable storage medium of claim 11, further including instructions for causing the processor to execute the method comprising:

generating a log associated with receiving the DNS request from the target device.

\* \* \* \* \*